Sept. 16, 1958

J. Z. DE LOREAN 2,851,906

TRANSMISSION

Filed Jan. 19, 1956

INVENTOR
JOHN Z. DeLOREAN
BY
Wilson Kedrow & Sadler

ATTORNEYS.

Sept. 16, 1958     J. Z. DE LOREAN     2,851,906
TRANSMISSION

Filed Jan. 19, 1956     3 Sheets-Sheet 2

INVENTOR.
John Z. De Lorean
BY
Wilson Pedrow & Sheler
ATTORNEYS.

Sept. 16, 1958

J. Z. DE LOREAN 2,851,906

TRANSMISSION

Filed Jan. 19, 1956

INVENTOR.
John Z. De Lorean
BY Wilson, Pedraw & Sadler

United States Patent Office 2,851,906
Patented Sept. 16, 1958

2,851,906
TRANSMISSION

John Z. De Lorean, Grosse Pointe Woods, Mich., assignor to Studebaker-Packard Corporation, Detroit, Mich., a corporation of Michigan Application January 19, 1956, Serial No. 560,201

20 Claims. (Cl. 74—677)

This invention relates to an automatic variable speed transmission, and more particularly it relates to a split torque transmission combining a torque converter and fluid coupling with a gear reduction system to provide a smooth transition throughout a plurality of driving speed ranges, as well as hydrodynamic braking for the rear wheels of the vehicle.

Various types of transmissions utilizing either converters or fluid couplings, in combination with a gear set, have previously been developed; however, none have proven entirely satisfactory, principally because efficiency of operation is sacrificed for smoothness of operation. In addition, these prior types of transmissions require extremely complicated hydraulic controls for shifting the transmission, as well as for modulating the action of the transmission clutches and brakes.

The applicant has designed a differential drive transmission which is particularly designed to overcome these undesirable characteristics of the prior developments in this field. The applicant's transmission not only provides the ultimate in smoothness of operation and is highly efficient in its operation throughout a wide range of driving speeds, but further, the economy of the applicant's transmission design and the simplification of its control system, results in a substantial savings in manufacturing and maintenance costs, as compared with present types of automatic transmissions used in the industry. In addition to these advantages, the applicant's transmission is also adapted to provide selectively operable hydrodynamic braking under coasting conditions, by means of overdriving the converter through the gear set, while at the same time braking the impeller member of the converter and the engine by means of the fluid coupling.

Other advantages and important features of the applicant's transmission will be apparent upon reading the following specifications, together with the accompanying drawings, in which:

Figure 1a is a sectional view partly broken away to show the constructional details of a portion of the transmission shown in Figure 1;

Figure 1:
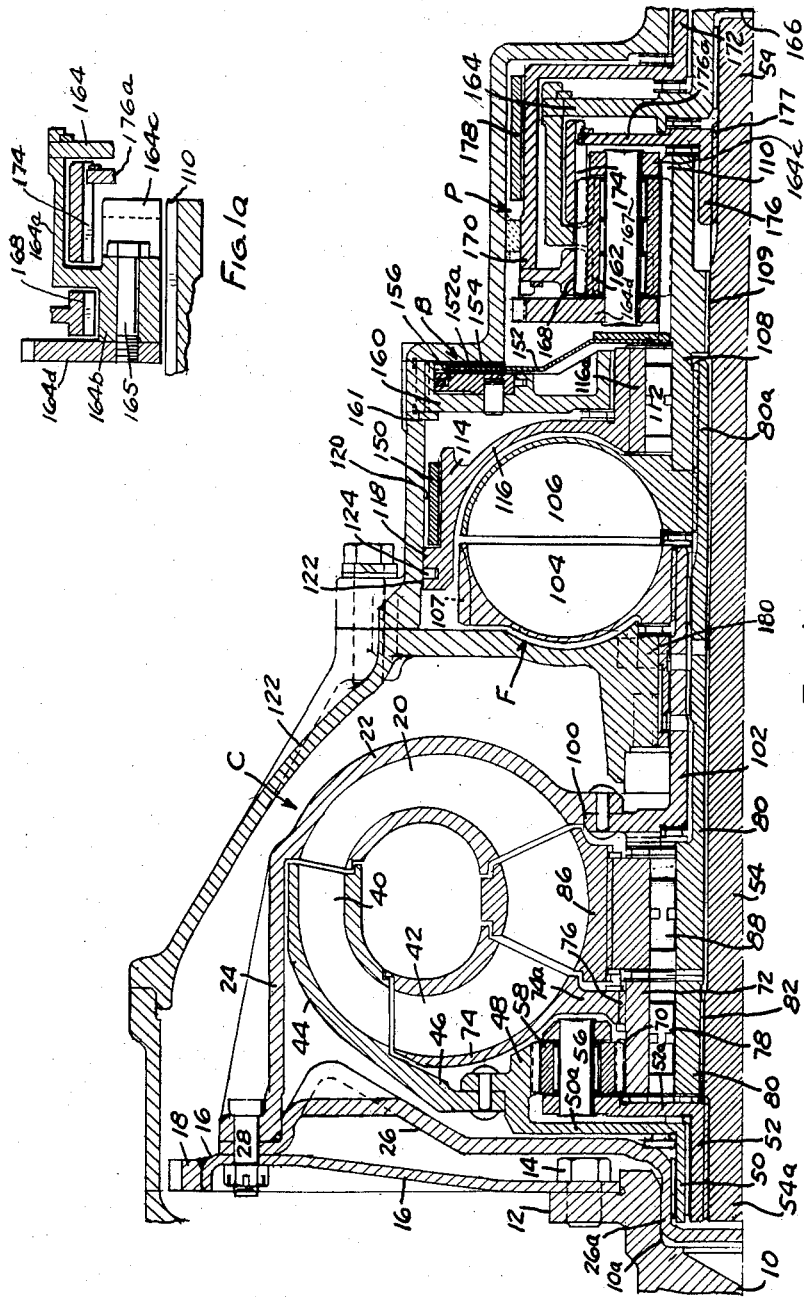
Figure 1 is a sectional side elevation showing one half of the transmission from its center line up.
Figure 2:
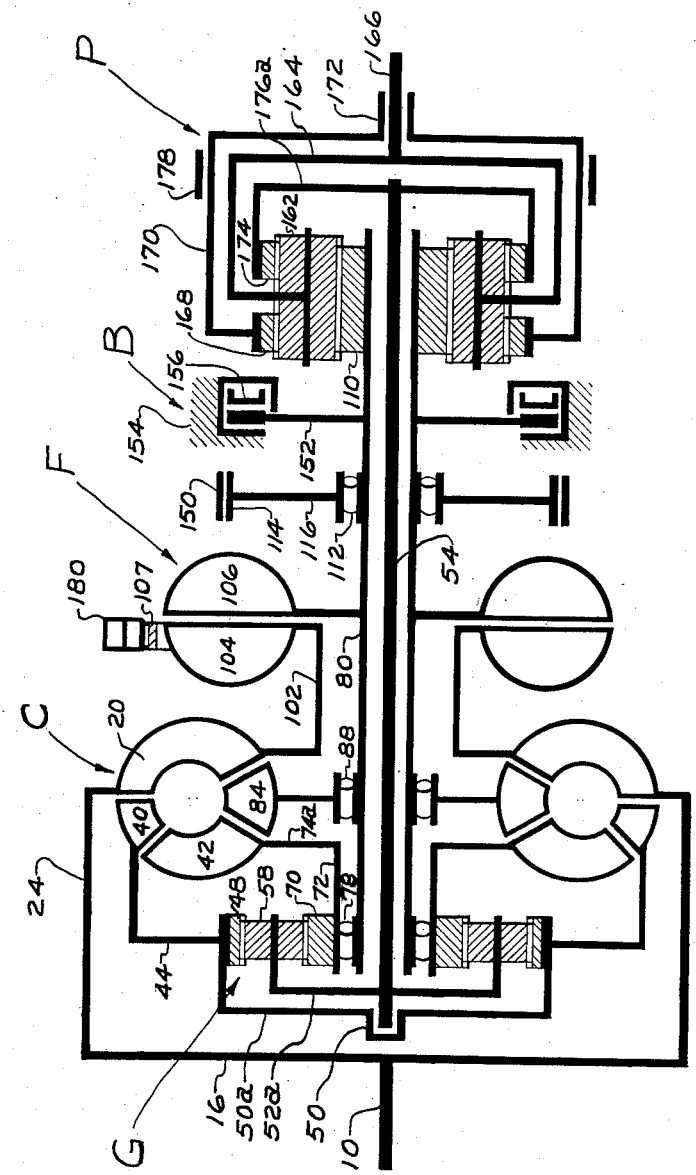
Figure 2 is a schematic side elevation of the transmission shown in Figure 1.

Figures 1 and 2 disclose a split torque transmission, including a torque converter C, a fluid coupling F and a planetary gear system P. An engine driven input shaft 10 has a flange 12 formed integral at one end thereof, which is secured by a screw 14 to an annular fly wheel 16 of stamped construction. A starter ring gear 18 is disposed about the outer periphery of the fly wheel 16, and is used for the purpose of cracking the engine in the conventional manner.

The converter C has a fluid energizing impeller 20 with an outer shell 22, formed integral with a skirt 24. The skirt 24 is secured to the fly wheel 16 and to the inwardly facing end wall 26 of the converter by screw 28. The converter end wall 26 has a cup shaped axial portion 26a, which is fixedly mounted within an axial bore 10a formed in the adjacent end of the drive shaft 10. The converter C also includes a turbine including a first stage member 40 and a second stage member 42, which are positioned in that order, adjacent the impeller 20. The first stage turbine member 40 has an outer shell 44 which is connected with a radially extending flanged portion 46 of an annular shaped internally toothed ring gear 48. The ring gear 48 is formed integral with a flanged portion 50a of a collar member 50 which is rotatably supported about a hub 52. The hub 52 in turn is splined to the forward end 54a of an intermediate shaft 54, disposed in substantially axial alignment with drive shaft 10. Hub 52 has a radially disposed flanged portion 52a which is adapted to support a longitudinally extending pinion shaft 56. Pinion shaft 56 rotatably supports a pinion gear 58 which meshes with the ring gear 48, and also with a sun gear 70.

The sun gear 70 is formed integrally with the forward end of a hub 72, which is rotatably supported by a one-way clutch mechanism 78, carried by a sleeve 80. The sleeve 80 in turn is rotatably supported about the intermediate shaft 54 by bushing members 82. The hub 72 is also splined at 76 to a radially extending element 74a which is formed integral with an outer shell 74 of the second stage turbine member 42.

A reactor member of the converter C has an outer shell portion 86 connecting with a one-way clutch mechanism 88, which is also carried by sleeve 80, adjacent the one-way clutch mechanism 78 for sun gear 70. The outer shell 22 of the impeller 20 is drivingly connected to a flanged portion 100 of a short outer sleeve member 102, which is rotatably supported about the first sleeve 80. The rearward end portion of sleeve 102 is splined to and is thus in driving engagement with a driving runner 104 of the fluid coupling F. The coupling F also has a driven runner 106 which is splined to and in driving engagement with the first sleeve 80. The coupling F is activated or rendered inoperable by filling or exhausting it of fluid, and this is accomplished by means of a control valve arrangement subsequently to be described in detail. Also, as is more clearly shown in Figure 2, an annular gear 107 may be formed integrally about the outer edge of the driving runner 104. The gear 107 is adapted to drive a front gear pump 180 for supplying hydraulic fluid to the transmission and controls. It will be understood, of course, that other means apparent to those skilled in the art may be utilized to drive the front pump 180, if desired.

The rearward end 80a of inner sleeve 80 is adapted to be received within, and is externally splined to, an internally splined hub member 108, which is rotatably supported about the rearward end of the intermediate shaft 54 by bushing 109. A reaction sun gear 110 is formed integrally with the rearward portion of hub member 108, and the latter carries a one-way clutch mechanism 112, which in turn is drivingly connected to brake drum 114 by member 116. It will be seen that member 116 and drum 114 are adapted to partially surround the fluid coupling F, and serve as a fluid retaining casing therefore. The outermost end of casing 116 has an annular rim portion 118 disposed adjacent to a concentric annular surface 120 formed about the interior of the transmission casing 122. A sealing ring 124 is interposed between the mating rim portions 118 and 120 of the fluid coupling and transmission casing, respectively, to prevent fluid from escaping therebetween.

A forward drive brake band 150 is adapted to engage drum 114, and the latter together with the one-way clutch mechanism 112 is adapted to hold reaction sun gear 110 and sleeve 80 against rotation in one direction. Also cooperating with the reaction sun gear 110 is the coast clutch B which includes a radially extending annular clutch element 152 which is splined at its lower end to the reaction sun gear hub 108. The outer end 152a of clutch element 152 is adapted to engage shoulder 154 formed in the rearward section of the transmission casing 122. An annular shaped piston 156 is slidably mounted within a piston chamber 158 formed within a piston housing 160. The outer end of the piston housing 160 is splined to the inner wall of the transmission casing 122 and is secured in position by a snap ring 161. The inner end of piston housing 160 is adapted to surround a hub portion 116a of the coupling enclosure 116, and suitable bushing means may be interposed therebetween if desired. The piston 156 is moved into engagement with the outer edge 152a of clutch element 152 by means of hydraulic fluid pressure admitted into the piston housing, thereby holding the clutch element 152 in friction engagement with shoulder 154 of the transmission casing 122. When clutch element 152 is thus held, the reaction sun gear 110 and inner sleeve 80 are thereby held in a fixed position.

The sun gear 110 of the planetary gear system P is adapted to mesh with a planet pinion 162 rotatably supported by a carrier member 164 in the conventional manner, which in turn is formed integral with the forward end of the output shaft 166; the latter being disposed in substantially axial alignment with the input and intermediate shafts 10 and 54, respectively. As shown in detail in Figure 1a, the carrier member 164 has an annular drum portion 164a which connects with an inwardly extending radial member 164b, having a shoulder 164c. The inwardly extending radial member 164b is connected by bolts 165 to an annular plate 164d. Pinion shaft 167 is supported at its opposite ends in aligned openings formed in shoulder 164c and plate 164d, and shaft 167 in turn rotatably supports planet pinion 162 shown in Figure 1.

An internally toothed ring gear 168 meshes with the forward portion of planet pinion 162, and ring gear 168 is carried by a drum 170. Drum 170 has a hub portion 172 formed at its rearward end, which is rotatably supported about the output shaft 166. A reverse brake band 178 is adapted to be engaged with drum 170 to hold the reverse ring gear 168 in a fixed position. The rearward portion of planet pinion 162 is adapted to mesh with a second annular internally toothed ring gear 174 carried by a radially flanged portion 176a of a hub member 176, which is splined to the intermediate shaft 54, as indicated at 177.

The operation of the transmission shown in Figures 1 and 2, as well as the sequence of operation of the clutches and brakes, will next be described in detail. Also, for the reader's convenience, a chart is set forth below indicating the sequence of operation of the transmission brakes and clutches, under different operative conditions.

| Range | Converter | Forward band | Coupling | Reverse band | Coast clutch |
|---|---|---|---|---|---|
| Low | T1 | On | Exhaust | Off | Off. |
| Intermediate | T2 | On | Exhaust | Off | Off. |
| High | T2 | Off | Filled | Off | Off. |
| Kickdown | T1 or T2 | On | Exhaust | Off | Off. |
| Hydrodynamic braking. | T1 & T2 vs. impeller. | On | Filled | Off | On. |
| Manual low | T1 | On | Exhaust | Off | On. |
| Reverse | "R" | Off | Exhaust | On | Off. |

*Operation of transmission*

With particular reference to Figure 2, it will be seen that to engage low range drive the forward brake band 150 is applied to drum 114, the coast brake B and the reverse band 178 are released, and coupling F is exhausted of fluid. When engine torque is applied to the input shaft 10, the impeller 20 drives the first stage turbine member 40, which drives the ring gear 48. The ring gear 48 drives the pinion 58 which in turn is walked about the reaction sun gear 70, the latter being held in a fixed position with respect thereto by the one-way clutch 78 carried by the sleeve 80. The sleeve 80 is held against rotation in the reverse direction in which the reaction force applied to sun gear 70 tends to drive it, by the one-way clutch mechanism 112, and the forward brake band 150. As a result, pinion carrier 52a is rotated, driving the intermediate shaft 54 and the driving ring gear 174. The ring gear 174 drives long pinion 162 of the planetary gears P, and the latter is walked about the reaction sun gear 110; the latter also being held by the one-way clutch 112 and by the application of the forward brake band 150 to drum 114. The pinion 162 is thus walked about the rear sun gear 110, rotating the pinion carrier 164 and the output shaft 166 in a forward driving direction in low range drive.

As the engine torque is increased and the speed of the second stage turbine member 42 approaches the speed of the impeller 20, the converter C commences to operate as a fluid coupling with the reactor 84 then being lifted off the one-way clutch mechanism 88 and rotating as a unit with the impeller and turbine members. Thus, the forward sun gear 70 is driven at a substantially 1:1 ratio with the engine, over-running the one-way clutch mechanism 78 carried by sleeve 80. Since ring gear 48 and the forward sun gear 70 are then being driven at substantially the same speed, pinion gear 58 is locked, and pinion carrier 52a and intermediate shaft 54 are driven at substantially a 1:1 speed ratio with respect to input shaft 10. Thus, output shaft 166 is driven in a forward driving direction at intermediate driving range as pinion 162 is walked about the held rearward sun gear 110, driving with it the pinion carrier 164. Under these conditions, substantially all of the torque multiplication delivered to the output shaft 166 is obtained through the planetary gears P; specifically by means of the difference in gear ratios between pinion gear 162 and sun gear 110. In this connection, it will be appreciated that the torque multiplication provided by the converter C, and the converter gear system G is gradually decreased as the second stage turbine 42 approaches the speed of impeller 20, until a 1:1 or direct drive relationship is reached with the intermediate shaft 54. This desired result is attained by virtue of the fact that as the speed of rotation of the second stage turbine member 42 is increased, sun gear 70 is driven therewith at a corresponding increase in speed. Thus, as the differential in the relative speeds of sun gear 70 and ring gear 48 diminishes, a corresponding decrease in torque multiplication is delivered through the converter gears G.

To obtain high range or 1:1 drive ratio, fluid is next admitted to the fluid coupling F with the result that the impeller driven runner 104 drives the driven runner 106. The driven runner in turn rotates the sleeve 80 and the rear sun gear 110; the former then being lifted off the one-way clutch mechanism 112. Under these conditions, it will be seen that since both ring gear 174 and the sun gear 110 are driven at substantially the same speeds, the planetary gear system P is locked, and as a result, pinion carrier 164 and output shaft 166 are driven at a 1:1 speed ratio.

In order to obtain a sudden increase in torque for rapid acceleration while in high range drive, the fluid coupling F is exhausted of fluid. The venting of the coupling F may be accomplished by depressing the engine accelerator beyond its maximum throttle position. The details of this operation will subsequently be described in detail, in conjunction with the description of the transmission control system. It will be appreciated, however, that other control arrangements may be utilized for this purpose, as will be apparent to those skilled in the art.

The venting of the coupling F conditions the transmission to operate in an intermediate driving range, since driven runner 106 and reaction sun gear 110 are then no longer driven at a 1:1 ratio with the engine and are held in a fixed position with respect to the intermediate shaft 54 by the one-way clutch mechanism 112 and brake band 150. In this connection, it will also be seen that increased torque multiplication may be obtained through the converter under certain engine torque output conditions. For example, while driving in intermediate or high range under moderate engine torque output conditions, when the engine accelerator is depressed to beyond its maximum throttle position, the increase in engine torque output delivered to the impeller, delivers torque through the first stage turbine 40 to the front ring gear 48, and the second stage turbine 42 and the front sun gear 72 are rotated if at all at substantially lower speeds. Thus, ring gear 48 drives the pinion 58 and, as the latter is walked about the forward sun gear 70, intermediate shaft 54 is rotated at a lower speed ratio, and as a result, the output shaft 166 is driven in low speed ratio.

When the speed of the rotation of the second stage turbine 42 once again approaches the speed of impeller 20 and converter C commences to operate at its theoretical coupling point, a 1:1 driving relationship is re-established between the input and intermediate shafts, through the converter gears G. Also, as the vehicle operator backs off the accelerator, and the engine is again operative within normal driving speed ranges, the transmission controls are conditioned to fill the coupling F, thereby re-engaging high range drive.

Hydrodynamic braking

While driving in any of the forward driving ranges, hydrodynamic braking may be obtained by activating the coast brake B. As piston 156 engages clutch element 152, the latter is held in a fixed position against the transmission casing 154, thereby holding sleeve 80, driven runner 106 and the reaction sun gear 110. At the same time, fluid is admitted to the coupling F, if it is not then already filled. Under these conditions, the speed of rotation of the normally driving runner 104 is rapidly retarded by the held runner 106. Thus, the speed of rotation of the converter impeller 20, the input shaft 10 and the vehicle engine are rapidly reduced to near idling speed. At the same time, as the engine throttle is retarded, the output shaft 166 tends to overdrive intermediate shaft 54, as carrier 164 and pinion 162 are walked about the held reaction sun gear 110, driving ring gear 174. The intermediate shaft 54 in turn drives the carrier 52a of the converter gears G, causing pinion 58 to walk about sun gear 70 which is held by the one-way brake mechanism 78. Thus, pinion 58 overdrives ring gear 48 and the first stage turbine member 40, and the latter attempts to overdrive impeller 20. Due to the relatively high differential in their respective speeds of rotation, an efficient braking action occurs between the impeller and turbine members.

It will be noted that the efficiency of the braking action on the rear wheels of the vehicle is increased due to the increased gear ratio provided by the planetary gears P and G. In this connection, it will be seen that when the coast brake B is applied, and the engine and impeller speeds are reduced to near idling, the transmission operates in low range drive. This is due to the fact that under low engine torque output conditions, little if any torque is transmitted through the second stage turbine member 42 to sun gear 70 of the converter gears G. Also, the main planetary gears P are then conditioned to operate in low range, since the rear sun gear 110 is held by the coast brake B.

Manual low

To obtain manual low drive, the transmission is operated as in automatic low, except the coast brake B is activated. Thus, sleeve 80 and sun gear 110 are held against rotation in either direction, to insure that a direct driving relationship is maintained between output shaft 166 and input shaft 10. Under these conditions, if output shaft 166 and the carrier 164 of the planetary system P tend to overspeed intermediate shaft 54, as for example under coasting conditions, the carrier 164 tends to drive pinion 162 faster than the driving ring gear 174 will permit. If the coast brake B were not applied, sun gear 110 would freewheel, lifting off the one-way clutch mechanism 112; however, since the coast brake B is operated, sun gear 110 is held in a fixed position, and the drive path is through pinion 162 and driving ring gear 174 to the converter gear system G. An increased gear ratio is thereby provided by the planetary gears P and also by the converter gears G; in the latter case by pinion 58 driving ring gear 48, which in turn tends to overdrive the first stage turbine member 40. The overdriven turbine member 40 tends to overdrive impeller 20 and the vehicle engine. Accordingly, it will be seen that in manual low the rear wheels are braked by the engine as well as by the braking action which occurs between the overdriven turbine 40 and impeller 20. In addition, the efficiency of braking action is increased by the increased gear ratios provided by overdriving through the main planetary system P and converter gears G.

Reverse

In order to operate the transmission in reverse drive, reverse band 178 is applied to drum 170, thereby holding reverse ring gear 168 against rotation. Also, coast clutch B and the forward drive brake 150 are released, and coupling F is exhausted of fluid. Thus, it will be seen that sleeve 80, as well as reactor 84 and sun gear 110 are free to rotate in either direction.

As engine torque is delivered to impeller 20, a toroidal movement of the fluid (counter-clockwise) is induced within the converter, which drives reactor 84 in a reverse direction and the latter drives sleeve 80 and sun gear 110 in a reverse direction through the one-way clutch mechanism 88. Sun gear 110 of the main planetary system P in turn drives pinion 162 and the latter is walked about the held reverse ring gear 168, driving with it carrier 164 and output shaft 166, in a reverse direction at a low gear ratio.

At the same time it will be noted that the driving ring gear 174 is held stationary by the planetating action of the pinion 162, and thus intermediate shaft 54 and carrier 52a of the converter gear set G are held stationary. Thus, as the first stage turbine member 40 drives ring gear 48, the latter drives the front sun gear 70 in a reverse direction through connecting pinion 58. It will be seen that since the reactor 84 is driving sleeve 80 in a reverse direction, the sun gear 70 is not held against reverse rotation by the one-way clutch mechanism 78 carried by the sleeve. It will be noted that as sun gear 70 is driven, it drives the second stage turbine 42 in a reverse direction. This relative inefficiency in the operation of the converter C, however, is not of great importance, since at low reverse driving speeds little, if any, torque is delivered to the second stage turbine 42 by the converter impeller 20. Thus, the front sun gear 70 is free to rotate in a reverse direction, and only a slight amount of reaction torque is transmitted through converter gears G, restraining the forward rotation of the first stage turbine member 40.

It will be appreciated that the above described transmission may be modified in various ways apparent to those skilled in the art. For example, other types of gear reduction systems may be utilized in place of the converter gears G and the main planetary gear set P; the latter may be adapted to provide 2, 3 and more gear ranges, if desired. Also, it will be recognized that a plurality of pinion gears 162, in the main planetary system P, may be utilized to drivingly connect sun gear 110 and ring gears 168 and 174. Also, it will be appreciated that other types of clutching mechanisms may be utilized to hold sleeve 80 against rotation for coast clutch operation. In addition, other types of selectively operable means may be utilized to drivingly connect the impeller 20 and reaction sun gear 110 for high range and coast braking operation. For example, a multiple disc type clutch or a brake band and drum may be utilized to drivingly connect the sleeve 102 with sleeve 80, thereby effecting a 1:1 drive between the impeller and reaction sun gear 110. It will be appreciated, however, that the coupling arrangement shown in F in Figures 1 and 2 has the advantage over a clutch, since its fluid operation provides a smooth transition to high range and also a smoother braking action with less wear to the parts when the coast brake B is operated.

*Transmission controls*

Figure 3:
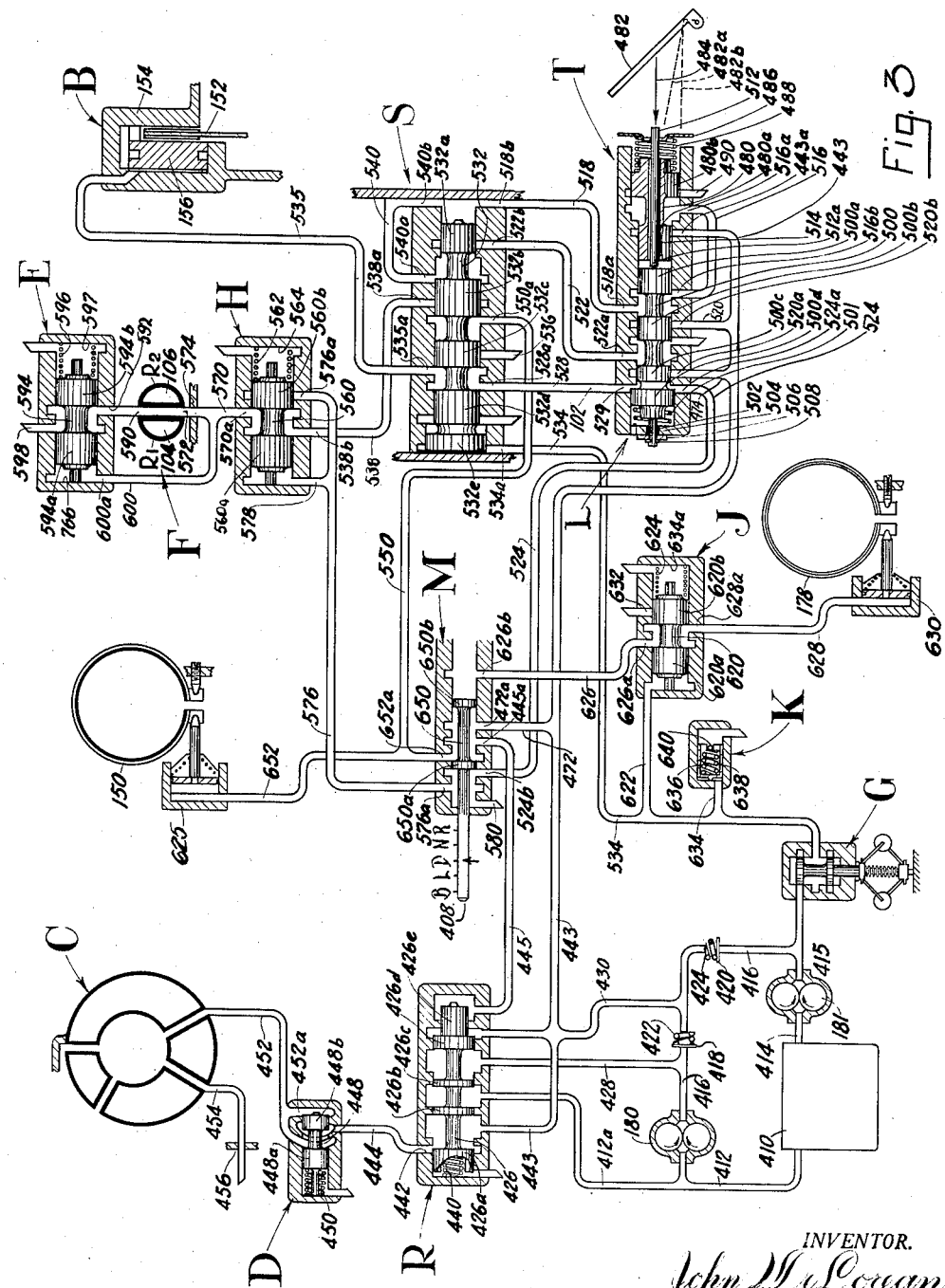
Figure 3 is a schematic view of the hydraulic controls for operating the transmission.

The transmission controls which are diagrammatically shown in Figure 3 may be utilized to operate the transmission above described. It will be noted that this control system is substantially the same as that described in my co-pending application, Serial No. 560,199, filed January 19, 1956. It is to be understood that other forms of control arrangements and different types of control valves may be utilized to operate the above transmission, as will be apparent to those skilled in the art, and the control arrangement next to be described is for the purpose of illustration only.

From an initial review of Figure 3, it will be seen that the principal components of the control system shown therein, are pressure regulator valve R, manual selector valve M, throttle valve T, low valve L, shift valve S, and the control valves H and E for the fluid coupling F. The pressure regulator valve R controls the operation of the front and rear pumps 180 and 181, respectively, and the admission of fluid to the converter valve D and the converter C. As is the common practice in transmissions of this general type, the front pump 180 is driven by the engine, as shown in Figure 1, and rear pump 181 may be driven by the output shaft 166 in the conventional manner. Thus, the front pump delivers fluid pressure to the system as soon as the engine is operating, and the rear pump is adapted to deliver pressure to the control system only when the transmission output shaft 166 is driven in a forward driving direction.

Throttle valve T is designed to deliver an increasing throttle pressure in proportion to the throttle increasing position of the engine accelerator pedal 482 to one side of shift valve S. Governor G is adapted to supply an increasing governor pressure to the opposite side of the shift valve S, in direct proportion to the forward driving speed of the vehicle. At certain values of governor and throttle pressure, shift valve S is moved to either its right or left hand position, thereby controlling the admission of fluid to the coupling F and the coast brake B. The governor G may be of any conventional design well known to one familiar with the art, and its specific form of construction does not form a part of this invention.

Low valve L, in conjunction with shift valve S, controls the admission of fluid pressure to the coast brake B. The manual selector valve M is operated in the conventional manner by a manual selector lever, and may be positioned in one of five positions; namely, reverse "R," neutral "N," forward drive "D," manual low "L," and coast braking "B," as indicated at 408. The effect of moving the manual selector valve to one of these five positions will subsequently be described in detail.

Before proceeding with a detailed description of the control valves, it will be appreciated that the forward servo 625 and the reverse servo 630 are utilized to operate the forward drive band 150, and the reverse band 178, shown in Figures 1 and 2. The forward servos may be of any conventional design well known to those skilled in the art, and their particular form of construction does not form a part of this invention.

As will be seen in Figure 3, the front and rear pumps 180 and 181 are connected with a hydraulic fluid reservoir 410 by conduits 412 and 414, respectively. Outlet conduit 415 of rear pump 181 connects with the hydraulic governor G, and thus hydraulic fluid is not delivered to the latter, unless the transmission output shaft is rotated in a forward driving direction. The capacity of front pump 180 is larger than that of the rear pump 181, and the outlets of each are connected by a fluid gallery 416. As mentioned above, the output of rear pump 181 increases in substantially direct proportion to vehicle speed, so that at a predetermined vehicle speed its output is equal to or greater than that of the front pump 180. To control the operation of the pumps, check valves 418 and 420 are connected in series with the gallery 416. Check valve 418 is biased closed by spring 422 against the front pump output pressure, and check valve 420 is biased closed by spring 424 against the rear pump output pressure. When the engine is started, the front pump output pressure opens check valve 418, and the pressure flowing therethrough assists spring 424 in holding the rear pump check valve 420 closed. As the vehicle speed increases and the rear pump pressure exceeds that of the front pump, check valve 420 is opened, and the front pump check valve 418 is closed.

The regulator valve R is connected with gallery 416 by lines 428 and 430, which communicate therewith on opposite sides of the front pump check valve 418, and with reservoir 410 through return line 412a. The regulator valve R includes a valve member 426 having lands 426a, 426b, 426c and 426d of equal diameter and a right hand land 426e of smaller diameter. Valve member 426 is normally biased to the right by a spring 440 so that land 426a closes port 442 communicating with converter valve D and converter C.

As the vehicle engine is started, pressure from front pump 180 is delivered through conduit 428 between lands 426c and 426d; the latter two being of equal diameter and, therefore, valve member 426 remains unmoved. At the same time, front pump pressure from line 430 is delivered to the right side of land 426d, thereby tending to move valve member 426 to the left, against the action of spring 440 whereby port 442 is uncovered and the fluid flows to the converter to start the car in motion. As the vehicle commences to move in a forward direction, and the pressure of fluid from the rear pump 181 is built up to exceed that of the front pump 180, check valve 420 is opened and the front pump check valve 418 is closed, and the higher rear pump pressure is then delivered through conduit 430 to the right side of land 426d. In addition, when the manual selector valve M is in any one of its forward driving positions, pump pressure from conduit 430 is delivered through conduit 443 to valve M and to conduit 445 to the right side of land 426e, thereby adding to the pressure tending to move valve member 426 to the left.

When valve member 426 is moved a sufficient distance to the left such that the port 442 somewhat passed its initial opening position, then land 426c is unseated, and front pump pressure from line 428 is permitted to flow between lands 426c and 426d to return line 412a. Upon further movement of valve 426 to the left, land 426b is unseated and pressure fluid from line 430 is allowed to enter return line 412a so that pressure behind lands 426d and e is reduced as is the pressure being supplied through port 442 to the converter. Therefore, it will be seen that regulator valve R is adapted to regulate the maximum pressure delivered by front and rear pumps to the system.

As above stated, it is only when valve member 426 is moved to the left that land 426a uncovers port 442, permitting pressure from lines 430 and 443 to flow therethrough, to line 444 connecting with converted valve D. Thus, the regular valve R also is adapted to insure that the converter C is supplied with fluid only after the other transmission controls are supplied adequate operative pressure.

The converter valve D serves as a pressure limit valve and includes valve member 448, having right and left hand lands 448a and 448b of equal diameter. Valve member 448 is biased in an open position by coil spring 450, so that pressure from line 444 is permitted to flow between the lands to the converter C, through line 452. The pressure in line 452 is also conducted through branch conduit 452a to the right side of valve land 448b, thereby tending to move valve member 448 to the left, against the action of spring 450. As valve member 448 is moved to the left, land 448b tends to close line 444, thereby reducing the pressure flow therethrough. As a result, the pressure flowing to converter C can never exceed a predetermined limit; this limit being determined by the force of spring 450. The converter C, it will be seen, has a return line 454 which may be connected with a sump in the reservoir 410, in the conventional manner. A restricted orifice 456 is connected in series with line 454 and serves to maintain pressure in the converter.

Pump pressure from line 430 is also delivered to the throttle control valve T by line 443, and in addition, branch conduits 472 and 474 communicating therewith, connect with the manual selector valve M and the low valve L, respectively. The throttle valve T and the low valve L include valve members 480 and 500, respectively, which are disposed in substantially axial alignment. An engine accelerator 482 is connected by linkage indicated at 484 with a spring retainer 486, and a coil spring 488 is interposed between the right hand end of throttle valve member 480 and the retainer 486. When the engine is not running, valve member 480 is in its left hand position, with land 480a uncovering port 443a. Thus, as soon as the engine is started, pump pressure from line 443 is admitted through port 443a, and due to the larger area of land 480b, valve member 480 is moved to the right, so that land 480a covers port 443a. As the engine accelerator 482 is moved from its idle throttle position, as shown, towards its maximum throttle position indicated at 482a, a greater force is applied through spring 488, tending to move valve member 480 to the left, opening port 443a. As a result, a modulated throttle pressure is permitted to flow between lands 480a and 480b to a centrally disposed port 516a, which is substantially proportional to the throttle opening position of the engine accelerator 482.

A coil spring 501 is disposed about the left hand end of low valve member 500, and the latter is reciprocally mounted through an opening 502, in valve casing 504. Spring 501 tends to move valve member 500 to the right, and a washer 506 and snap ring 508 serve to limit the right hand movement of the low valve member 500.

A kick-down rod 512 is reciprocally mounted in an axial opening extending through throttle valve member 480, and its opposite ends are adapted to engage the right hand end of the low valve member 500 and throttle valve spring retainer 486, respectively. Thus, when the engine accelerator 482 is moved to its kick-down position, indicated at 482b, spring retainer 486 moves kick-down rod 512 to the left, and thus the latter positively moves low valve member 500 to its left hand position, with the result that the transmission is then conditioned to operate in low or intermediate range, in a manner subsequently to be described in detail. In this connection it will be noted that kick-down rod 512 is arranged so that it moves valve member 500 to the left, only when the accelerator pedal 482 is depressed beyond its maximum throttle position.

Port 516a of throttle valve T is connected by line 516 with a radial port 516b in low valve L, and thus throttle pressure is admitted to the latter. As the engine accelerator 482 is moved towards its maximum throttle position, a proportionately increasing throttle pressure is delivered through line 516 to the low valve L, by virtue of the metering action occurring between lands 480a and port 443a.

Low valve member 500 is formed with lands 500a, 500b and 500c of equal diameter, and land 500d of larger diameter disposed about its left hand portion. When valve member 500 is in its right hand position, land 500a uncovers port 516b, and lands 500b and 500a are disposed on opposite sides of port 518a connecting with conduit 518, which in turn connects with the right hand end of shift valve S. Lands 500c and 500b cover ports 520a and 520b connecting with opposite ends of passageway 520; the latter being connected with branch conduit 474. A radial port 522a is disposed between lands 500c and 500b, and is connected by conduit 522 with radial port 522b near the right hand end of shift valve S. An annular port 524a is connected by conduit 524 with port 524b in the manual selector valve M, and is also connected by conduit 528 with radial port 528a near the left hand end of shift valve S. It will be seen that no pressure is admitted through annular port 524a, when the manual selector valve M is in its neutral "N," drive "D" or reverse "R" positions, as will subsequently be described in detail.

The shift valve S includes a valve member 532 having a right hand land 532a of relatively small diameter, three centrally disposed lands 532b, 532c and 532d of equal and larger diameter, and a left hand land 532e of still larger diameter. A radial port 534a is disposed at its left hand end and communicates with conduit 534 connecting with governor G. When shift valve member 532 is in its left hand position, as shown in the drawing, radial ports 528a and 535a connecting with coast brake B through conduit 535, are uncovered by land 532d. At the same time, land 532c covers vent port 536 connecting with the sump, and land 532b covers port 538a, which is connected with port 538b in brake valve H, through conduit 538. Also, land 532b uncovers port 540a which is connected to the right hand end of the shift valve S, through passageway 540. In addition, the right hand land 532a closes port 522b connecting with the low valve L through conduit 522. When shift valve member 532 is in its right hand position, land 532a uncovers port 522b, land 532b closes port 540a and opens port 538a. Land 532c uncovers vent port 536, thereby permitting fluid from the coast clutch B to be vented therethrough to the sump. Also, land 532d closes port 528a.

The coupling valve H includes a valve member 560 having left and right hand lands 560a and 560b of equal diameter. A coil spring 562, interposed between the right hand side of valve member 560 and the adjacent end 564 of the valve housing, urges valve member 560 to the left so that land 560a uncovers port 538b, admitting pressure from the shift valve S. Pressure from line 538 and port 538b is thus permitted to flow between lands 560a and 560b to radial port 570a which is connected by line 570 with the inlet 572 of the fluid coupling F. A restricted orifice 574 is connected in series with line 570 to retard fluid flow therethrough. Further, it will be seen that land 560b closes port 576a which communicates with the manual selector valve M through line 576. Pressure from conduit 576 is also admitted to the left hand side of the coupling valve member 560, through branch conduit 578, which acts to move valve member 560 to the right, against the action of spring 562. When valve member 560 is in its right hand position, land 560a closes port 538b, and land 560b uncovers port 576a, permitting pump pressure to be admitted through the latter, to the coupling F.

The fluid coupling F has an outlet port 590 disposed near its outer perimeter, which communicates with a centrally disposed radial port 592 in the side of exhaust valve E. The exhaust valve E includes a valve member 594 having left and right hand lands 594a and 594b, respectively, of equal diameter. A coil spring 596 retained between the right hand end of the valve member 594 and the adjacent end 597 of the exhaust valve, normally moves valve member 594 to its left hand position (as shown in the drawing), and spring 596 has a greater force than coupling valve spring 562. In its left hand position it will be seen that valve land 594a uncovers an exhaust port 598 communicating with the sump. When fluid pressure is admitted by the coupling valve H to line 570 which communicates with the coupling inlet 572, pressure from line 570 is also delivered through conduit 600 to the left hand end of the exhaust valve member 594, through a radial port 600a. The pressure from line 600 tends to move valve member 594 to its right hand position, against the action of the coil spring 596, whereupon land 594a closes the vent port 598, thereby preventing the coupling F from being exhausted of fluid. When pressure in line 576 drops a slight amount, as for example when line 576 is vented to the sump through the manual selector valve vent port 580, the greater force of spring 596, as compared with spring 562, moves valve member 594 sufficiently to the left that the exhaust valve inlet port 592 connects with vent port 598 before the coupling valve member 560 can close port 570a from port 576a. In this connection those familiar with the art will appreciate the fact that the centrifugal force developed by the engine driven runner 104 assists in rapidly venting the coupling F of fluid.

The reverse valve J includes a valve member 620 having two lands, 620a and 620b of equal diameter, formed near the opposite ends thereof. Governor pressure from line 534 is delivered through line 622 to the left hand end of valve member 620, thereby moving the latter to the right, against the action of coil spring 624 which bears against the right hand side of the reverse valve member. When valve member 620 is moved to its left hand position, land 620a uncovers radial port 626a, which communicates with port 626b in the manual selector valve M, through line 626. Thus, pressure from line 626 is permitted to flow between lands 620a and 620b to a centrally disposed radial port 628a, and thence through line 628 to the reverse servo 630. When governor pressure is admitted through line 622 to the left side of valve member 620, the latter is moved to the right, whereupon land 620a covers port 626a, and land 620b uncovers vent port 632. As a result, fluid from the reverse servo line 628 is permitted to flow between lands 620a and 620b to vent port 632, and thence to the sump. As previously mentioned, the governor G delivers governor pressure only when the vehicle is operating in the forward driving direction, and therefore, reverse valve J is conditioned to exhaust fluid from the reverse servo 630, at all times except when the vehicle is standing still or operating in reverse drive. Also in this connection, it will be apparent upon reading the following description of the operation of the controls, that when the manual selector valve M is in its neutral position or any position except reverse, no pressure is admitted to reverse servo line 626, and thus, regardless of the position of reverse valve J, reverse servo 630 cannot be operated.

Before proceeding with a description of the operation of the controls above described, it will be noted that the system includes a park blocker valve K which is connected with the governor pressure line 534 through branch conduit 634. The park blocker valve K includes a small piston 636 which is biased to the left against the action of governor pressure, by coil spring 638. Thus, whenever governor pressure is admitted to line 534, piston 636 is moved to the right against the action of spring 638, holding the park locking pin 640 in its right hand position, thereby insuring that the conventional park locking mechanism is fully disengaged. It will be understood that pin 640 may be connected to any conventional type of wheel locking mechanism, and the form of the latter or its mode of operation, does not constitute a part of this invention.

*Operation of controls*

The manual selector valve M includes a manually operated valve member 650 which, as previously explained, may be moved to any one of five positions indicated at 408. The manual selector valve member 650 has lands 650a, 650b of equal diameter, which in their neutral positions are disposed just to the left of port 445a and to the left of the reverse servo line port 626b, respectively. Thus, when the engine is operating, pump pressure from lines 430, 443 and branch conduit 472 is admitted between lands 650a and 650b, and is permitted to flow only through port 445a to the right hand end of the regulator valve R, through line 445. As previously explained, pump pressure acting on the right hand side of regulator valve lands 426d and 426e, moves the valve to the left, thereby permitting pump pressure from line 443 to flow through line 444, valve D, and thence to converter C. Therefore, it will be seen that as soon as the engine is operating, the control system is first filled with pressure fluid, and the converter C is then filled with fluid and is prepared to drive the vehicle when the manual selector valve M is moved to one of its driving positions.

When the manual selector valve member 650 is moved to its normal drive "D" position, as is illustrated in Figure 3, it will be seen that land 650b still blocks off the reverse servo port 626b, and land 650a is positioned to the left of port 445a and also to the left of radial port 652a. Thus, pump pressure from conduit 472 is permitted to flow through port 445a to the regulator valve R, and also through line 652 to the forward servo which is then conditioned to apply the forward drive band 150, to drum 114, as shown in Figures 1 and 2. Pump pressure from line 652 is also admitted through conduit 550 connecting with the shift valve S.

Under these conditions, it will be seen that as the engine accelerator 482 is depressed, throttle valve member 480 is moved sufficiently to the left so that a proportional pressure is admitted to passageway 516, and thence to port 516b in the low valve L. Due to the action of spring 501, low valve member 500 is then in its right hand position, so that land 500a uncovers port 516b, permitting pressure to flow therethrough to line 518 connecting with the right hand side of shift valve S. Assuming that the vehicle is operating at relatively low speeds, little or no governor pressure is admitted to the left hand side of shift valve S, through line 534. Thus the pressure from line 518 acts upon the right hand side of land 532a moving shift valve member 532 towards its left hand position. As valve member 532 is moved towards the left, valve land 532b uncovers port 540a, whereupon pressure from line 518 is admitted through passageway 540 to the right side of land 532b. Due to the increased valve surface area then being acted upon by the pressure in line 518, shift valve member 532 is thereupon moved rapidly and held positively to its full left hand position.

When the shift valve member 532 is in its left hand position, as shown in Figure 3, it will be seen that pump pressure from line 550 is not permitted to flow to the coupling valve H through line 538, since valve land 532b then covers port 538a. As a result, no pressure can flow to coupling F, and the fluid, if any, in coupling F is exhausted through vent port 598 in exhaust valve E. It will be seen that the transmission is then conditioned to operate in low range drive and also, as previously explained, when the vehicle speed increases and the second stage turbine 42 approaches the speed of impeller 20, as described in connection with Figures 1 and 2, the converter gears G are locked, and output shaft 166 is conditioned to operate in an intermediate driving range.

As the vehicle speed increases still further, and a proportionately increased governor pressure is admitted through line 534 to the left side of shift valve S, shift valve member 532 tends to move to the right against the action of the throttle pressure acting against its right hand end.

Under predetermined conditions of governor and throttle pressures, say for example when the vehicle is operating under normal conditions at approximately twenty-six miles per hour, shift valve member 532 is moved towards the right, so that land 532b closes port 540a. Thereupon, due to the decrease in valve surface area acted upon by the throttle pressure, valve member 532 is moved positively and rapidly to its full right hand position. Under these conditions it will be seen that land 532b uncovers port 538a, and thus pump pressure from line 550 is permitted to flow therethrough to the coupling valve H and thence to coupling F, and also to the left side of the coupling exhaust valve E. As previously explained, exhaust valve member 594 is thereupon moved to its right hand position, closing vent port 598. As described in connection with Figures 1 and 2, the transmission is then conditioned to operate in direct or high range drive, since the converter gears G, as well as the main planetary gear system P, drive the output shaft 166 at a 1:1 ratio with input shaft 10.

While operating in high range under normal throttle conditions, if the engine accelerator 482 is moved rapidly towards its maximum throttle position 482a, a proportionately increasing throttle pressure is admitted to shift valve S through line 518, and may under some conditions overcome the effect of the governor pressure, thus moving shift valve S to its left hand position. When this occurs, pump pressure from line 550 cannot flow to the coupling F, and the fluid in coupling F is exhausted through vent port 598 of the exhaust valve E, when the pressure in lines 570 and 600 drops a relatively slight amount due to leakage in this system. This again establishes the intermediate drive wherein the gear system P is unlocked, but yet the converter gears G may still drive at a 1:1 ratio.

Similarly, this condition can be produced at any time, if while operating under normal conditions at high range, the accelerator pedal 482 is moved beyond its maximum throttle position to its kickdown position 482b, kickdown rod 512 moves low valve member 500 to its left hand position, against the action of spring 501. Under these conditions, it will be seen that low valve land 500a closes port 516b, thus preventing throttle pressure from flowing from line 518 to the shift valve S. However, lands 500b and 500c uncover ports 520b and 520a, respectively, whereupon pump pressure from line 443 and branch conduit 474 and passageway 520, is permitted to flow between lands 500a, 500b and 500c to ports 518a and 522a and thence through lines 518 and 522, to ports 518b and 522b in shift valve S. If under these conditions shift valve S is in its right hand position, port 522b is uncovered by land 532a, and the pressure admitted therethrough acts upon the right hand side of land 532b. As a result, the shift valve member 532 is moved rapidly to the left, assisted by pump pressure from line 518 acting on land 532a. As land 532a closes port 522b, land 532b uncovers port 540a; therefore, it will be seen that at all times during the leftward movement of shift valve member 532, pump pressure acts on the combined surface areas of lands 532a and 532b, with the result that shift valve S is moved rapidly and held positively in its left hand position. As explained above, this causes the coupling F to be exhausted of fluid, and thus conditions the transmission to operate in an intermediate or low range drive.

In this connection, it will be appreciated that the shift valve S may be arranged so that above a predetermined vehicle speed, governor pressure will be of a sufficiently high value to prevent the left hand movement of the shift valve member 532. For this purpose, the surface area of left hand land 532e may be made sufficiently large so that the force applied by governor pressure above a predetermined vehicle speed, is sufficient to overcome the force of pump pressure acting on lands 532a and 532b.

When the manual selector valve M is placed in its manual low "L" position, land 650a is moved to the left side of port 524b. As a result, the system is conditioned to operate in the same manner as in the normal forward drive "D" position, except that pump pressure admitted through port 472 flows between lands 650a and 650b to port 524b. The pump pressure thus admitted through port 524b flows through conduit 524 to port 524a in the low valve "L." Pressure admitted through port 524a moves low valve member 500 to its left hand position, due to the larger surface area of land 500d as compared with that of the adjacent land 500c. As a result, pump pressure from conduit 524 is permitted to flow between lands 500c and 500d to port 529, and thence through line 528 to radial port 528a in shift valve S. As previously explained, when the low valve L is moved to its left hand position, shift valve S is also rapidly and positively moved to its left hand position, thereby causing the coupling F to be exhausted of fluid, and thereby conditioning the transmission to operate in low range. At the same time pump pressure flowing from the low valve L through line 528 flows between lands 532c and 532d of shift valve S, and thence through conduit 535 to the coast clutch B. The pressure from line 535, it will be seen, moves coast clutch piston 156 into engagement with clutch element 152, and as explained in connection with Figures 1 and 2, this maintains a direct driving relationship between the input and output shafts of the transmission.

In this connection, it will be noted that if for any reason shift valve S is not moved to its left hand or low range engaging position, pump pressure cannot flow to the coast clutch through port 528a, since the latter is closed by land 532d, and at the same time pressure in line 535 is vented through vent port 536, which is then uncovered by land 532c.

One of the features of the above described operation of the controls in the manual low position is that an upshift from a low to an intermediate driving range may be accomplished. As described in connection with Figures 1 and 2, this occurs when the speed of rotation of the second stage turbine 42 approaches the speed of rotation of impeller 20, thereby effectively locking the converter gear set G, and driving transmission intermediate shaft 54 at a 1:1 ratio with input shaft 10.

When the manual selector valve M is moved to its braking "B" position, land 650a of selector valve member 650 is moved to the left hand side of port 576b, and land 650b is moved just to the right side of pump pressure inlet port 472a. Under these conditions, pump pressure is admitted to the same lines as in the manual low "L" position, except that pump pressure from port 472a is permitted to flow between lands 650a and 650b, to port 576b, and thence through line 576 to the coupling valve H. The pressure thus admitted to the left side of coupling valve member 560, moves the latter to its right hand position so that pump pressure from line 576 is permitted to flow between the lands to line 570. As a result, coupling F is filled with fluid. It will be noted that the coupling will remain filled with fluid regardless of the position of shift valve S; port 538b then being covered by land 560b. At the same time, providing of course that shift valve S is moved to its left hand or low range position, pump pressure from low valve line 528 is admitted to coast brake B through line 535, thereby effecting the engagement of coast brake B. In other words, when the manual selector valve is in its braking "B" position, the coupling F is immediately filled with fluid, but the coast brake B will be operated only if shift valve S is conditioned to effect the operation of low or intermediate range. It will be appreciated, however, that the present control system may be modified if desired so that the coast brake B is rendered operative, at all times when the manual selector valve M is placed in its braking "B" position.

Under these conditions, as described in connection with Figures 1 and 2, a high degree of braking action for the rear wheels of the vehicle is developed, due to the differential in the speeds of the vehicle overdriven turbine and the coupling and engine braked impeller, of the converter C.

To condition the transmission to operate in reverse drive, the manual selector valve member 650 is moved to its "R" position. Thus, land 650b is positioned on the right hand side of the reverse valve inlet port 626b, and land 650a is positioned just to the left of pump pressure inlet port 472a. As a result, all other ports in the manual selector valve M are closed to pump pressure and are vented through vent port 580, and the pump pressure admitted through port 472a flows between lands 650a and 650b to reverse valve inlet port 626b. Also in this connection, it will be noted that in all of the positions of the manual selector valve member 650 except reverse, 626b is closed to pump pressure by land 650b. Pump pressure thus admitted to line 626 flows between lands 620a and 620b of reverse valve member 620, which is then in its left hand position, as shown in Figure 3, since no governor pressure is then available to oppose the action of reverse valve spring 624. As a result, pump pressure flows from reverse valve J, through line 628 connecting with the reverse servo 630, and as previously explained, the latter applies reverse band 178 to drum 170, and the transmission is conditioned to operate in reverse drive. It will be noted also that when the manual selector valve M is in its reverse "R" position, left hand land 650a is moved to the right of port 652a, thereby permitting the forward servo pressure in line 652 to be vented to the sump through selector valve vent port 580.

From the above description of the transmission controls, it will be apparent that the individual valves, as well as the control arrangement, may be varied in various ways apparent to those skilled in the art, or if desired, an entirely different type of control arrangement may be used to operate the transmission shown in Figures 1 and 2. It will also be appreciated that the transmission arrangement may be modified in various ways apparent to those skilled in the art, and therefore it is to be understood that the above specification, as well as the accompanying disclosures, are for the purpose of illustration only, and should not be construed as limiting the scope of the following claims.

I claim:

1. A transmission comprising a fluid driving means having a driving member and driven members, an input shaft connecting with said driving member, a variable gear reduction system for driving an output shaft, said system including at least two driving elements, gear means to drivingly connect the driven member with one of the driving elements, and selectively operable means to drivingly connect the input shaft with the other of said driving element, said driven members including first and second stage turbine elements drivingly connected with said gear means.

2. A transmission as described in claim 1 wherein said selectively operable means includes a fluid coupling drivingly connecting the input shaft with said other of said driving elements, and actuatable means to render the coupling inoperative.

3. A transmission comprising a fluid torque converter having driving and driven members and a reactor member, an input shaft connecting with said driving member, a variable gear reduction system for driving an output shaft, said system including at least two driving elements, which when both are driven condition the gear reduction system to operate in high range drive, additional gear means to drivingly connect the converter driven member with one of the driving elements, and selectively operable means to drivingly connect the input shaft with the other of said driving elements, said reactor member being connected to said other of said driving elements for driving the latter in a reverse direction.

4. A transmission as described in claim 3 wherein said converter turbine member includes a first and second stage turbine means drivingly connected with said additional gear means, whereby as the first stage turbine means is driven by the driving converter member said one driving element is driven in gear reduction drive, and as said second stage turbine means is driven at substantially the same speed as the driving converter member, said one driving element is driven at a 1:1 ratio with respect to the input shaft.

5. A transmission comprising a fluid torque converter including impeller and turbine members, a fluid coupling having driving and driven runners, an input shaft drivingly connected with the converter impeller and the driving coupling runner, a variable gear reduction system for driving an output shaft, said system including two rotatable driving means, additional gear means to drivingly connect the converter turbine member with one of the rotatable driving means, means to drivingly connect said driven coupling runner with said other rotatable driving means to drive the latter when the coupling is filled with fluid, a holding means actuated by selectively operable means to hold said driven runner and other rotatable driving means against rotation, and a filling means actuated by a second selectively operable means to reduce the speed of rotation of the driving coupling runner, the impeller member and input shaft.

6. A transmission as described in claim 5, wherein said variable gear reduction system includes a carrier member operably connected to said output shaft, pinion means rotatably supported by said carrier, and wherein said one driving means includes a ring gear meshing with said pinion means and said other driving means includes a sun gear also meshing with said pinion means.

7. A transmission as described in claim 5 wherein said turbine member includes two turbine elements, and said additional gear means includes a ring gear driven by one of said turbine elements, a gun gear driven by the other of said turbine elements, rotatable pinion means meshing with said ring gear and sun gear and drivingly connecting with said one rotatable driving means of the gear reduction system, and means to hold said sun gear against rotation in one direction.

8. A transmission comprising a fluid torque converter having impeller, turbine and reactor members, a fluid coupling including driving and driven runners, and a gear reduction system for driving an output shaft, said system including a rotatable driving element and a rotatable reaction element, an input shaft drivingly connected with said impeller member and with the driving coupling runner, means to exhaust and fill the coupling with fluid, means to drivingly connect said driven coupling runner with said reaction element to drive the latter when the coupling is filled with fluid, means to hold said reaction element against rotation in one direction, means to drivingly connect the converter turbine member with said rotatable driving element, selectively operable means for holding said converter reactor member against rotation in a reverse direction, means to drivingly connect the reactor member with said rotatable reaction element to drive the latter in a reverse direction when the reactor member is free to be driven in a reverse direction, and a second selectively operable means to hold said driving coupling runner against rotation to brake the speed of rotation of the driving coupling runner, impeller member and input shaft when coupling is filled with fluid.

9. A transmission as described in claim 8 wherein said converter turbine member and said means to drivingly connect the turbine member with said rotatable driving element includes first and second stage turbine elements, a ring gear driven by said first stage turbine element, a sun gear driven by said second stage turbine element, and rotatable pinion means meshing with said ring gear and sun gear and drivingly connecting with said rotatable driving element of the gear reduction system.

10. A transmission comprising a fluid torque converter having impeller and turbine members, a fluid coupling having driving and driven runners, a planetary gear system for driving an output shaft, said system including a carrier member operably connected to said output shaft, pinion means rotatably supported by said carrier member, a driving ring gear meshing with said pinion means, a reaction sun gear also meshing with said pinion means, an input shaft drivingly connected to said converter impeller and said coupling driving runner, an intermediate shaft driven by said turbine member for driving said driving ring gear, a sleeve rotatably supported about said intermediate shaft drivingly connected to said coupling driven runner and said reaction sun gear, selectively operable means to hold said reaction sun gear against rotation, and selectively operable means to exhaust and fill the coupling with fluid.

11. A transmission comprising a converter having impeller, turbine and reactor members, a fluid coupling having driving and driven runners, a planetary gear system for driving an output shaft, said system including a carrier member operably connected to said output shaft, pinion means rotatably supported by said carrier member, a driving ring gear meshing with said pinion means, a reaction sun gear also meshing with said pinion means, an input shaft drivingly connected with said converter impeller and said coupling driving runner, an intermediate shaft driven by said turbine member for driving said driving ring gear, a sleeve rotatably supported about said intermediate shaft drivingly connected to said coupling driven runner and said reaction sun gear, one-way clutch means connecting said converter reactor member with said sleeve, selectively operable means to hold said sleeve against rotation in one direction, a second selectively operable means for holding said sun gear and driven coupling runner against rotation in either direction, and selectively operable means to admit or exhaust fluid from said coupling.

12. A transmission as described in claim 11 wherein said turbine member includes two turbine elements, a ring gear driven by one of said turbine elements, a sun gear driven by the other of said turbine elements, one-way clutch means to hold said sun gear against rotation in one direction with respect to said sleeve, and pinion gear means carried by said intermediate shaft meshing with said ring gear and sun gear.

13. A transmission as described in claim 11, wherein said turbine member includes a first stage turbine element and a second stage turbine element, a ring gear drivingly connected to said first stage turbine element, a sun gear drivingly connected to said second stage turbine element, a one-way clutch means connecting said sun gear with said sleeve, a pinion meshing with said ring gear and said sun gear, and carrier means connecting with said intermediate shaft for rotatably supporting said pinion gear.

14. A transmission as described in claim 11 including a third selectively operable means including reaction means meshing with said pinion means, whereby when the latter is operated and said first and second selectively operable means are rendered inoperative, said converter reactor member drives said reaction sun gear in a reverse direction with respect to the normal direction of rotation of said impeller member, thereby rotating said carrier member in a reverse direction.

15. A transmission comprising a converter having impeller, first stage turbine, second stage turbine and reactor members, a fluid coupling having driving and driven runners, means to render the fluid coupling inoperative, a variable gear reduction system for driving an output shaft, said system including a carrier member operably connected to said output shaft, pinion means rotatably supported by said carrier member, a driving ring gear meshing with said pinion gear means, a reaction sun gear also meshing with said pinion gear means, an input shaft drivingly connected with said impeller member and said coupling driving runner, an intermediate shaft drivingly connected with said driving ring gear, a sleeve rotatably supported about said intermediate shaft connecting said driven coupling runner with said reaction sun gear to drive the latter at a 1:1 ratio with respect to the input shaft, when the coupling is operative, selectively operable means to hold said sleeve against rotation in one direction, a second selectively operable means to hold said sleeve against rotation in both directions, holding said driven coupling runner against rotation and thereby braking the speed of rotation of the driving coupling runner, the converter impeller member and the input shaft, when the coupling is operative, one-way clutch means connecting the converter reactor member with said sleeve, and a second gear reduction means to drivingly connect said first and second stage turbine members with said intermediate shaft, whereby said driving ring gear is driven in gear reduction drive when said first stage turbine member is driven by the converter impeller member and said sun gear is driven substantially at a 1:1 ratio with respect to the input shaft.

16. A transmission as described in claim 15 including an internally toothed reverse reaction ring gear meshing with the pinion gear means of said variable gear reduction system, and selectively operable reverse brake means to hold said reverse ring gear against rotation.

17. A transmission as described in claim 15 wherein said second gear reduction means includes a pinion gear, means drivingly connected with said intermediate shaft for rotatably supporting said pinion gear, a first gear means driven by said first stage turbine member meshing with said pinion gear, a second gear means meshing with said pinion gear driven by said second stage turbine member, means to hold said second gear means against rotation in one direction with respect to said sleeve.

18. A transmission comprising a fluid torque converter having impeller, first stage turbine, second stage turbine and reactor members, a fluid coupling having driving and driven runners, a gear reduction system including a carrier member, pinion gear means rotatably supported by said carrier member, an internally toothed driving ring gear meshing with said pinion gear means, an internally toothed reverse ring gear also meshing with said pinion gear means, an input shaft drivingly connected with said impeller member and the coupling driving runner, an intermediate shaft connecting with said driving ring gear, an output shaft drivingly connected to said carrier member, a sleeve rotatably supported about said intermediate shaft and drivingly connected to said coupling driven runner, a sun gear fixedly supported on said sleeve and meshing with said pinion gear means, a third ring gear driven by said first stage turbine member, a second sun gear driven by said second stage turbine member, a second pinion gear meshing with said third ring gear and said second sun gear, means drivingly connected to said intermediate shaft for rotatably supporting said second pinion gear, means for holding said second sun gear against rotation in one direction with respect to said sleeve, means to hold said converter reactor member against rotation in one direction with respect to the sleeve, selectively operable means to fill and exhaust the coupling of fluid, second selectively operable means including means to hold said sleeve against rotation in one direction and means to hold said sleeve against rotation in either direction, and a third selectively operable means to hold said reverse ring gear against rotation.

19. A transmission as described in claim 18 wherein said means to drivingly connect the input shaft with the converter impeller and coupling driving runner includes a collar rotatably supported about said sleeve, said collar having radially extending elements disposed about its opposite ends connecting with the converter impeller member and the coupling driving runner, respectively.

20. A transmission as described in claim 18 including an annular ring gear formed about said coupling driving runner, and pump means driven by said ring gear for supplying fluid under pressure to said transmission.

References Cited in the file of this patent

UNITED STATES PATENTS

| | | |
|---|---|---|
| 2,351,213 | James | June 13, 1944 |
| 2,762,237 | Kelbel | Sept. 11, 1956 |